US005293983A

United States Patent [19]

Grapes et al.

[11] Patent Number: 5,293,983

[45] Date of Patent: Mar. 15, 1994

[54] TRANSPORT/STACKER MODULE FOR MAIL PROCESSING SYSTEM

[75] Inventors: Thomas F. Grapes, Columbia; James A. Rew, Millersville, both of Md.; Charles M. Miller, Seven Valleys, Pa.; John J. Buckley, Jr., Hanover, Md.; Stanley K. Wakamiya, Ellicott City, Md.; David J. Tilles, Baltimore, Md.; William L. DeHaven, Millersville, Md.

[73] Assignee: Westinghouse Electric Corp., Pittsburgh, Pa.

[21] Appl. No.: 742,753

[22] Filed: Aug. 9, 1991

[51] Int. Cl.[5] .............. B65G 37/00

[52] U.S. Cl. .............. 198/358; 209/900; 198/367; 198/483.1; 198/704

[58] Field of Search .............. 198/358, 367, 704, 483.1; 209/900, 653, 546; 271/298, 300, 2, 184

[56] References Cited

U.S. PATENT DOCUMENTS

| | | | |
|---|---|---|---|
| 3,696,946 | 10/1972 | Hunter et al. | 209/900 X |
| 3,757,939 | 9/1973 | Henig | 209/584 |
| 3,791,515 | 2/1974 | Wood | 209/698 |
| 3,815,897 | 6/1974 | Hoehl et al. | 271/9 |
| 3,889,811 | 6/1975 | Yoshimura | 209/549 |
| 4,106,636 | 8/1978 | Ouimet et al. | 198/350 |
| 4,171,739 | 10/1979 | Yamoto | 198/704 |
| 4,172,525 | 10/1979 | Hams et al. | 209/564 |
| 4,247,008 | 1/1981 | Dobbs | 209/569 |
| 4,274,783 | 6/1981 | Eineichner et al. | 198/349.95 |
| 4,432,458 | 2/1984 | Daboub | 209/564 |
| 4,634,111 | 1/1987 | Frank | 271/34 |
| 4,884,796 | 12/1989 | Daboub | 271/111 |
| 4,887,953 | 12/1989 | Greub | 198/435 X |
| 4,892,172 | 1/1990 | Lassiter, Jr. et al. | 198/365 |
| 4,963,251 | 10/1990 | Böhm et al. | 209/900 X |
| 5,009,321 | 4/1991 | Keough | 209/3.1 |
| 5,014,975 | 5/1991 | Hamricke | 271/202 |
| 5,096,047 | 3/1992 | Morikiyo et al. | 198/704 |

*Primary Examiner*—Cheryl L. Gastineau
*Attorney, Agent, or Firm*—Norman A. Nixon

[57] ABSTRACT

A transport/stacker module provides for a vertical stacking of mail bins. Carriers traveling in a transport path have openable and closable doors at both ends, and a frame of the transport/stacker module is provided with cam actuators to open the doors after the carriers pass turnaround areas and close the doors before the carriers enter the turnaround areas. A rake mechanism disposed above each bin is provided with a snubber which engages a mail piece prior to rake tines of the rake mechanism.

15 Claims, 14 Drawing Sheets

TRANSPORT/STACKER MODULE FOR MAIL PROCESSING SYSTEM

BACKGROUND OF THE INVENTION

1. Field of the Invention

The present invention relates generally to mail processing systems and equipment and, more specifically, to a transport/stacker module for a flats mail sorter system.

2. Description of the Related Art

A typical automated mail system includes a mail induction system and a transport system. As shown in FIGS. 1 and 2, the mail induction system 10 feeds pieces of mail to an oval or "race track" transport conveyor 12 which carries a plurality of mail piece carriers 14. The induction system 10 delivers one mail piece to each carrier 14 as the carriers travel in a given direction (counterclockwise in FIG. 1).

A plurality of bins 16 are disposed under the movable carriers 14. Each bin 16 is designated for a particular mail stop, address, etc., and a pivotally mounted rake 18 is disposed over the carriers 14 at each bin 16. When a piece of mail arrives over its destination bin, the rake 18 is actuated to pivot downwardly to push the mail piece off the carrier and into the designated bin.

As shown in FIGS. 3 and 4, the rake 18 is mounted on a shaft 20 journalled in a pair of supports **20*a* and 20*b* carried by the frame (not shown) and includes a plurality of rake tines 22 which interleave with slots 24 formed in a forward, angled end 26 of the carrier 14. A bottom 28 of the carrier 14 is integrally formed with the forward end 26**.

Prior to actuation of the rake 18, the tines 22 are disposed horizontally (90° counterclockwise rotated from the position illustrated in FIG. 3). A lever 30 is fixedly mounted on the shaft 20 in line with the tines 22. A push rod 32 has a proximal end pivotally connected to the lever 30 and a distal end which is unattached. A spring 34 has a coiled portion, through which the push rod 32 extends, a first end connected to the lever 30 and a second, opposite end connected to a second lever 36. The lever 36 is fixedly mounted on and rotatable with a second shaft 38. When the tines 22 and lever 30 are in a substantially horizontal position, the push rod 32 abuts against the upper end of the lever 36 and causes same to rotate counterclockwise with the shaft 38 until it reaches a nearly horizontal disposition.

As seen in FIG. 3, the shaft 38 carries an arm 40 which functions as a retarder such that, as the carrier 14 moves under the rake 18 when the rake is actuated to the vertical position by an actuator (not shown), the arm 40 rotates clockwise to engage a mail piece 42 as the rake 18 pushes the mail piece 42 off the carrier 14. The mail piece 42 may be a piece of "flats mail" which generally refers to magazines, large envelopes, newspapers, circulars, catalogs, digests, etc. The arm 40 is intended to control the "bounce back" of the mail piece caused by the rake tines 22 to allow neat stacking of the mail in the bins 16. An adjustable stop 44 provides a limit to the downward movement of the arm 40.

The system described above, and others of similar construction, have certain inherent deficiencies. First of all, the carriers have one open end and another end with a fixed end plate. The open end is a source of potential loss of mail pieces during transport, while the fixed end limits discharge of the mail piece to one direction.

Moreover, the rake mechanism and retarder arms require a rather complex linkage to interconnect the two.

Also, the oval, horizontally oriented conveyor 12 requires a large amount of floor space and is not easily expanded to accommodate additional bins.

SUMMARY OF THE INVENTION

An object of the present invention is therefore to provide a transport/stacker module which is capable of being integrated into a mail sorter system.

Another object of the present invention is to provide a transport/stacker module with improved rake and carrier mechanisms.

Another object of the present invention is to provide a transport/stacker module which has greater space efficiency.

Yet another object of the present invention is to provide a transport/stacker module which can be easily expanded to accommodate a greater number of destination bins and carriers.

These and other objects of the invention are met by providing a transport/stacker module which includes a support frame having a front end and a rear end, the front end being adjacent a mail induction system, a first pair of front sprockets mounted in the front end of the frame for rotation about a horizontal axis transverse the frame, a first pair of rear sprockets mounted in the rear end of the frame for rotation about a horizontal axis transverse the frame, an endless loop conveyor running between the first pairs of the front and rear sprockets and defining a first run and a second run vertically above the first run, a plurality of horizontally oriented carriers attached to the conveyor at spaced intervals, each carrier receiving a mail piece from the mail induction system, a plurality of bins disposed between the first and second runs, each having an open top disposed below the second run, drive means for rotating one of the first pairs of front and rear sprockets thus moving the carriers along a transport path, and a plurality of rake mechanisms, one being disposed above each of the plurality of bins and above the second run, each rake mechanism being selectively actuated to rake a mail piece from a corresponding one of the carriers into a designated one of the bins as the drive means positions the corresponding carrier over the designated bin.

These and other objects and features of the present invention will become more apparent with reference to the following detailed description and drawings.

DETAILED DESCRIPTION OF THE PREFERRED EMBODIMENTS

Figure 1:
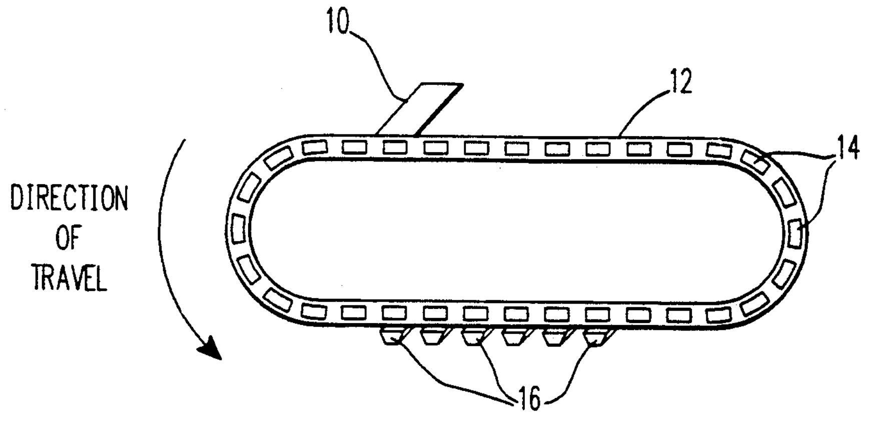
PRIOR ART FIG. 1
FIG. 1 is a schematic, plan view of a known transport/stacker system.
Figure 2:
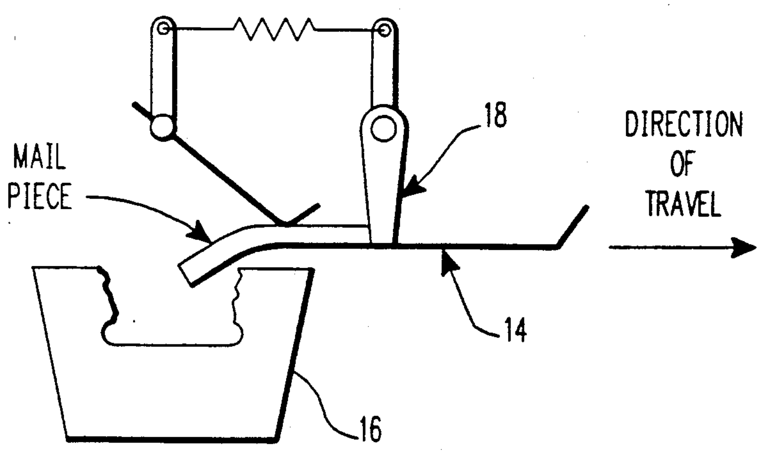
PRIOR ART FIG. 2
FIG. 2 is an enlarged, side elevational view of the encircled area of FIG. 1.
Figure 3:
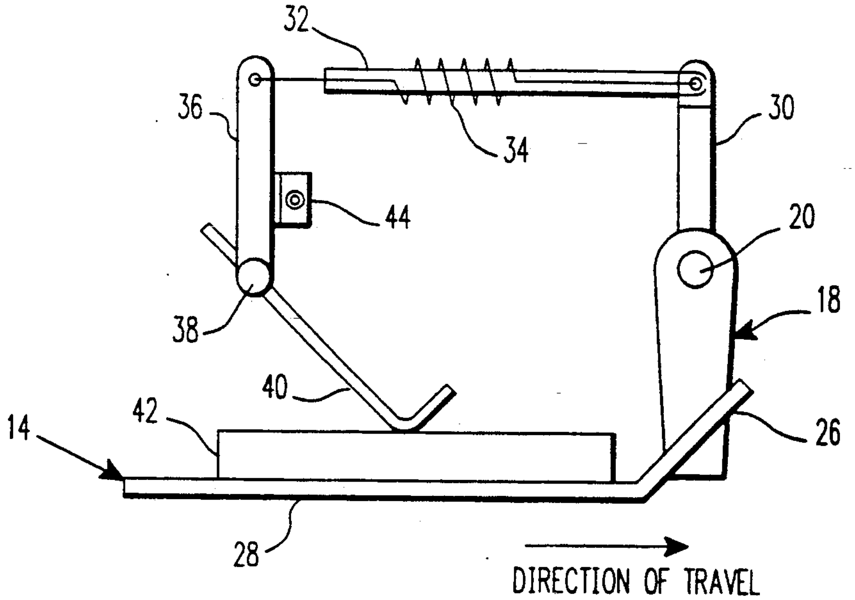
PRIOR ART FIG. 3
FIG. 3 is a side elevational view, similar to FIG. 2, showing details of a rake mechanism used in the system of FIG. 1.
Figure 4:
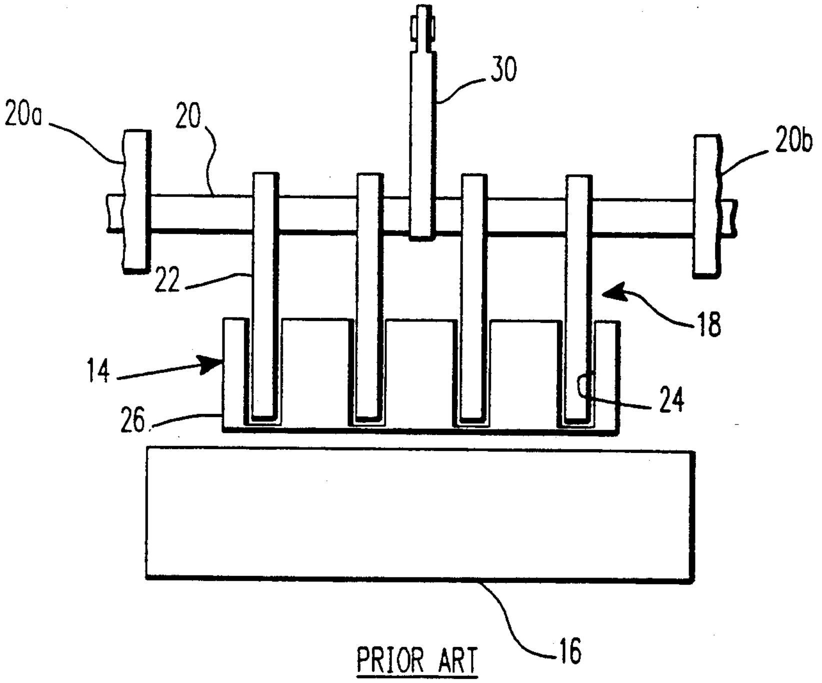
PRIOR ART FIG. 4
FIG. 4 is a front view of the rake mechanism of FIG. 3.
Figure 5:
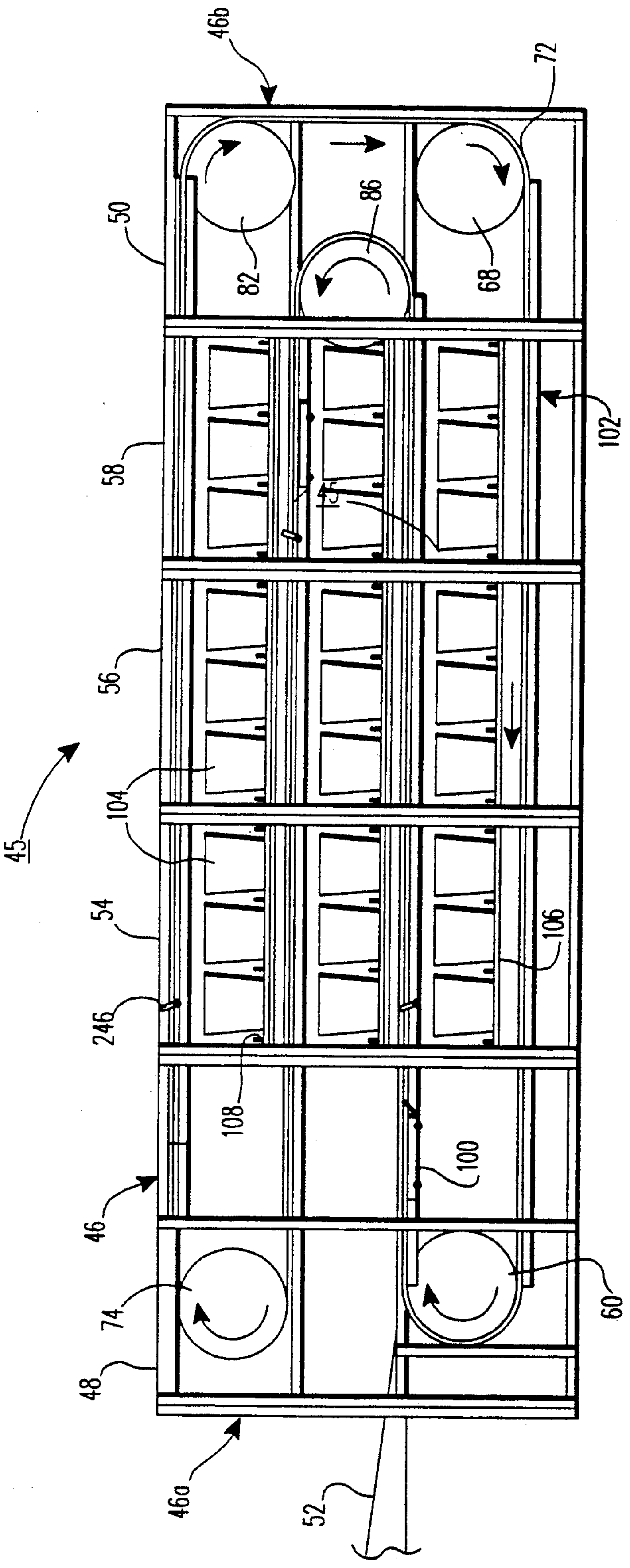
FIG. 5 is a side elevational view of a transport/stacker module according to the present invention.
Figure 6:
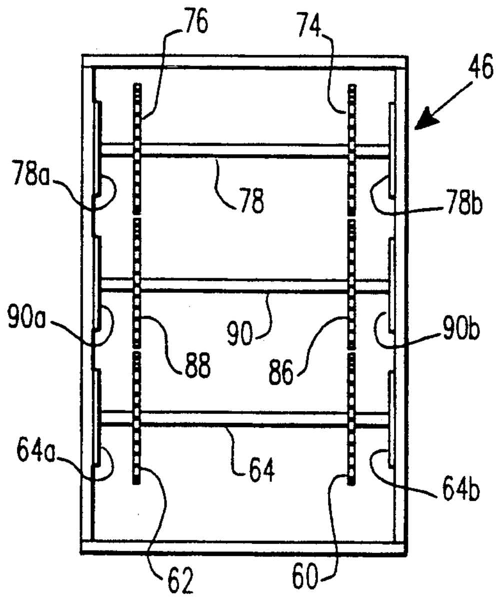
FIG. 6 is a front view of the transport/stacker module of FIG. 5, with portions removed to illustrate the sprockets mounted therein.
Figure 7:
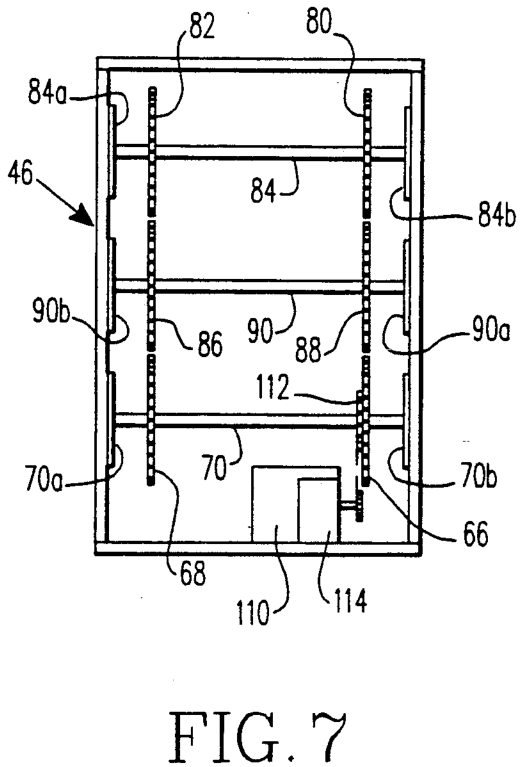
FIG. 7 is a rear view of the transport/stacker module of FIG. 5 with portions removed to illustrate the sprockets mounted therein.

Referring now to FIGS. 5-7, a transport/stacker module is generally referred to by the numeral 45 and includes a long rectangular frame 46 having a front end 46*a* and a rear end 46*b*. The frame 46 is constructed in sections to facilitate expansion and contraction to suit individual mail handling needs of the customer. An interface section 48 is disposed at the front end 46*a* of the frame while a drive module 50 is disposed at the rear end 46*b*. The interface section 48 receives a discharge chute 52 of a mail induction system (not shown). Typically, a mail induction system conveys mail pieces to a transport system so that the mail pieces are delivered to designated mail bins of the transport system under the control of a system controller.

Bin sections 54, 56 and 58 of the frame are disposed between the interface section 48 and the drive section 50. The number of bin sections can be increased, or decreased, depending on the needs of the customer. For this purpose, the frame 46 is constructed in sections which are coupled together.

A first pair of front sprockets 60 and 62 are rotatably mounted on a shaft 64 journalled between a pair of support plates 64*a* and 64*b* mounted on opposite sides of the frame 46 with suitable bearings (not shown). The axis of rotation of the two sprockets 60 and 62 is horizontal and transverse the longitudinal direction of the frame 46.

A first pair of rear sprockets 66 and 68 are also rotatably mounted on a shaft 70 journalled between a pair of support plates 70*a* and 70*b* mounted on opposite sides of the frame 46.

The axis of rotation of the pair of sprockets 66 and 68 is also horizontal and transverse the frame 46.

An endless loop conveyor, such as a chain drive 72 (FIG. 8) runs between the first and second pairs of sprockets to define a plurality of runs. Preferably, the module includes a second pair of front sprockets 74 and 76 mounted above the first pair of sprockets 60 and 62 on a shaft 78 journalled between opposite support plates 78*a* and 78*b*, and a second pair of rear sprockets 80 and 82 mounted above the first pair of rear sprockets 66 and 68 on a shaft 84 journalled between opposite support plates 84*a* and 84*b*. A third pair of rear sprockets 86 and 88 is mounted on a shaft 90 journalled between opposite support plates 90*a* and 90*b* and is disposed between the first and second rear pairs of sprockets and slightly forward thereof.

Figure 8:
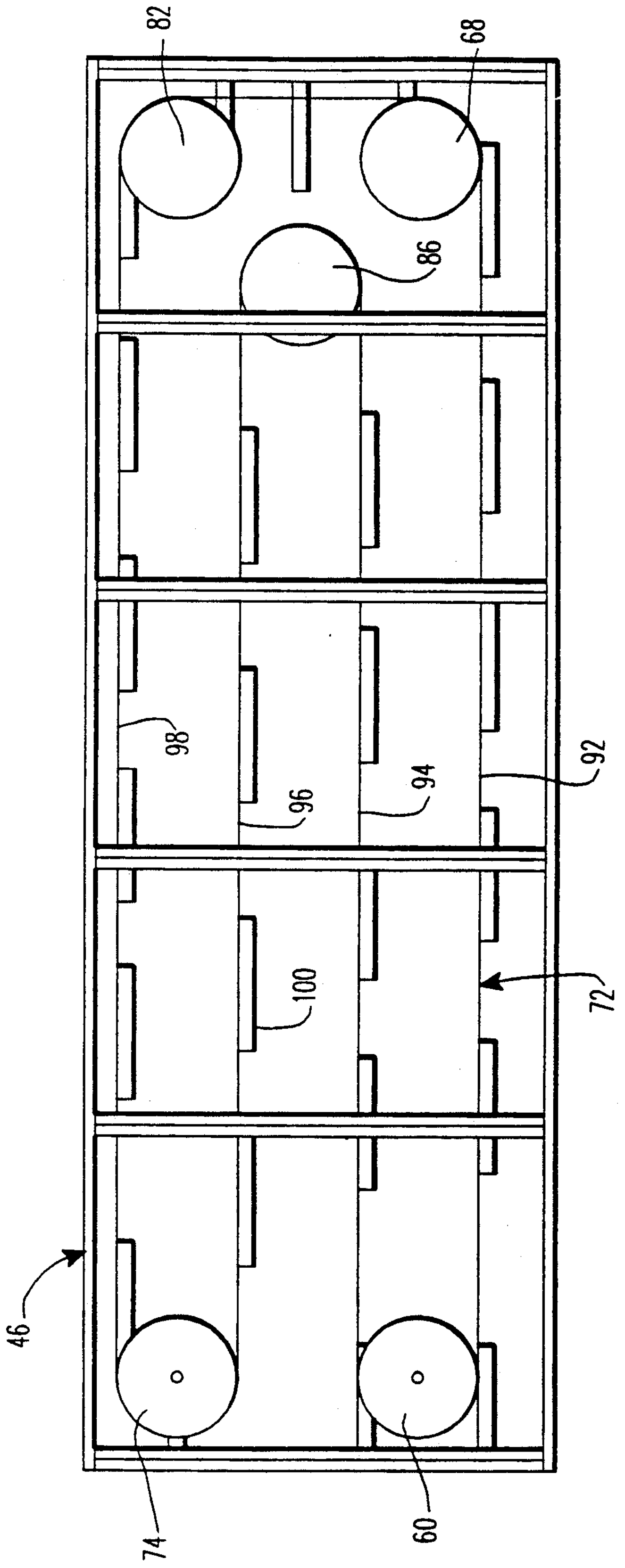
FIG. 8 is a side elevational view, similar to FIG. 5 with portions removed to illustrate plural, vertically stacked runs.

The chain drive 72 includes two endless loop chains, one running on sprockets 60, 68, 82, 86, and 74, and the other running one sprockets 62, 76, 80, 66 and 88. Thus, as shown in FIG. 8, the two chains define a plurality of vertically stacked runs 92, 94, 96, and 98.

A plurality of carriers 100 are mounted between the two chains and are disposed at equidistantly spaced intervals. The carriers 100 are horizontally oriented and are guided throughout the transport path by a guide track system 102 (FIG. 5) in order to maintain a horizontal orientation of the carriers even when making a turnaround on the sprockets.

As shown in FIG. 5, a plurality of containers such as bins 104 are disposed between the runs of the conveyor chains so that the carriers on the second, third and fourth runs (94, 96, and 98 in FIG. 8) pass over the open tops of the bins 104. Preferably, the bins 104 rest on shelves 106 mounted transversely between vertical supports of the frame 46. The shelves 106 may be provided with sensors 108 to detect when a bin is removed, or when a bin is full, so that the system controller can stop the delivery of mail pieces to that particular bin. Another aspect of the present invention would be to employ conveyors in place of the bins to function with shingled stacking, in a manner similar to that feature which is provided by automatic feeders. Also, while sensors could be used to detect when the bin or other type of container or conveyor is full, the system controller can be programmed to determine a bin-full condition by tracking the number of pieces or accumulated thickness or weight of the mail in each bin position.

A drive motor 110 (FIG. 7) is coupled to a drive sprocket 112 through a chain, and preferably through a speed reducing gear box 114 so as to impart rotary motion in the shaft 70 and thus the sprockets 66 and 68. The induced rotary motion drives the two chains of the chain device 72 in a preferred direction illustrated by directional arrows in FIG. 5, so that the lower most run approaches the forward end of the frame. The direction of movement could be reversed, if desired, with the only modification required that the cam plates which open and close the doors of the containers would have to be switched to opposite sides.

A plurality of rake mechanisms 246, illustrated schematically in FIG. 5, are mounted on horizontal supports of the frame 46 above each bin 104 at a forward end thereof. The rake mechanisms are actuated upon receipt of a system controller signal when it is determined that a mail piece in a particular carrier is over a designated bin. The rake mechanism 246 pivots downwardly to rake the mail from the carrier 100 into the appropriate bin while the conveyor runs continuously. Details of the rake mechanism will be provided below.

Referring now to FIGS. 9-14, each carrier 100 includes a bottom plate 118 having a first end 118*a* and a second end 118*b* from which two opposite side plates 120 and 122 extend upwardly. The side plates 120 and 122 can be attached to the side edges of the bottom plate 118 with threaded fasteners, a weld line, or other suitable means. Alternatively, the bottom plate 118 and side plates 120 and 122 can be integrally formed.

Figure 13:
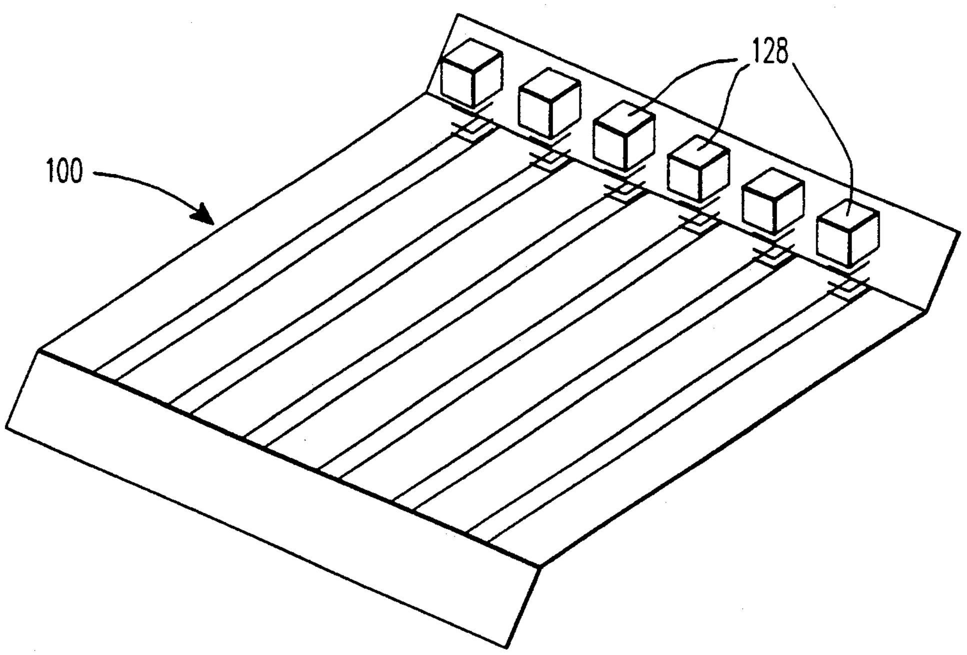
FIG. 13 is a perspective, schematic view of the preferred carrier and associated light detectors.
Figure 14:
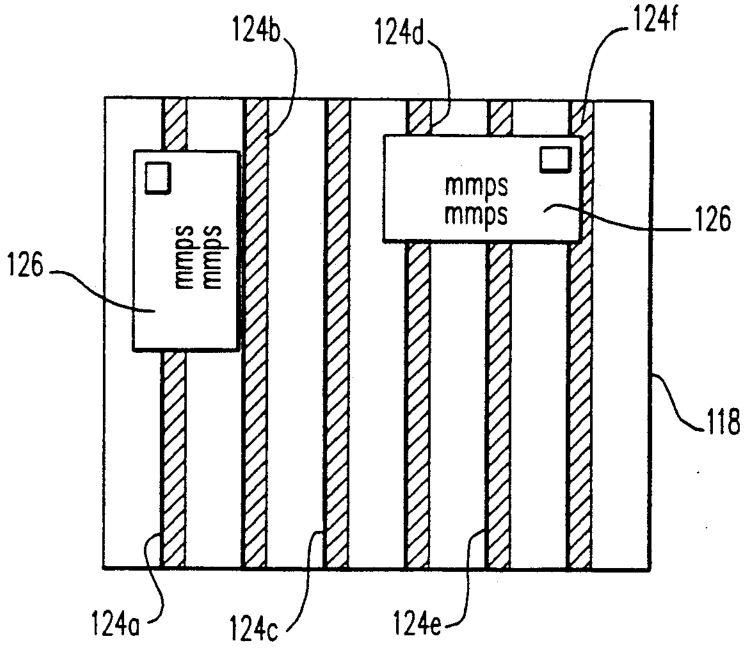
FIG. 14 is a plan, schematic view showing the upper surface of the carrier with reflection steps therein.

The upper surface 118*c* of the bottom plate 118 is provided with a plurality of parallel grooves 118*d* which coincide in spacing with the tines of a rake mechanism (to be described in greater detail below). As shown in FIGS. 13 and 14, a plurality of reflective strips 124*a*, 124*b*, 124*c*, 124*d*, 124*e* and 124*f* are fixed in the bottom of the corresponding grooves 118*d*, with means such as adhesives. Placing the strips in the grooves prevents the reflective strips from being worn off by friction with mail pieces.

The grooves 118*d* are spaced to detect the presence of a mail piece as small as a 3×5 post card 126 whether oriented longitudinally (as the card on the left side of FIG. 14) or transversely (right side of FIG. 14). It should be noted that two post cards 126 are illustrated in FIG. 14 to show orientation. In practice, a carrier 100 is intended to carry only one mail piece at a time. If two pieces are loaded into a single carrier by mistake, the system controller could be programmed to detect their presence, based on the signals output from the sensors to the controller. Also, the controller determines that a carrier is empty by receiving six long, uninterrupted signals from the sensor 128 (FIG. 13) disposed above the strips. A mail piece blocks the reflective strip and interrupts the signal, thus providing an indication of a carrier loaded condition.

Figure 9:
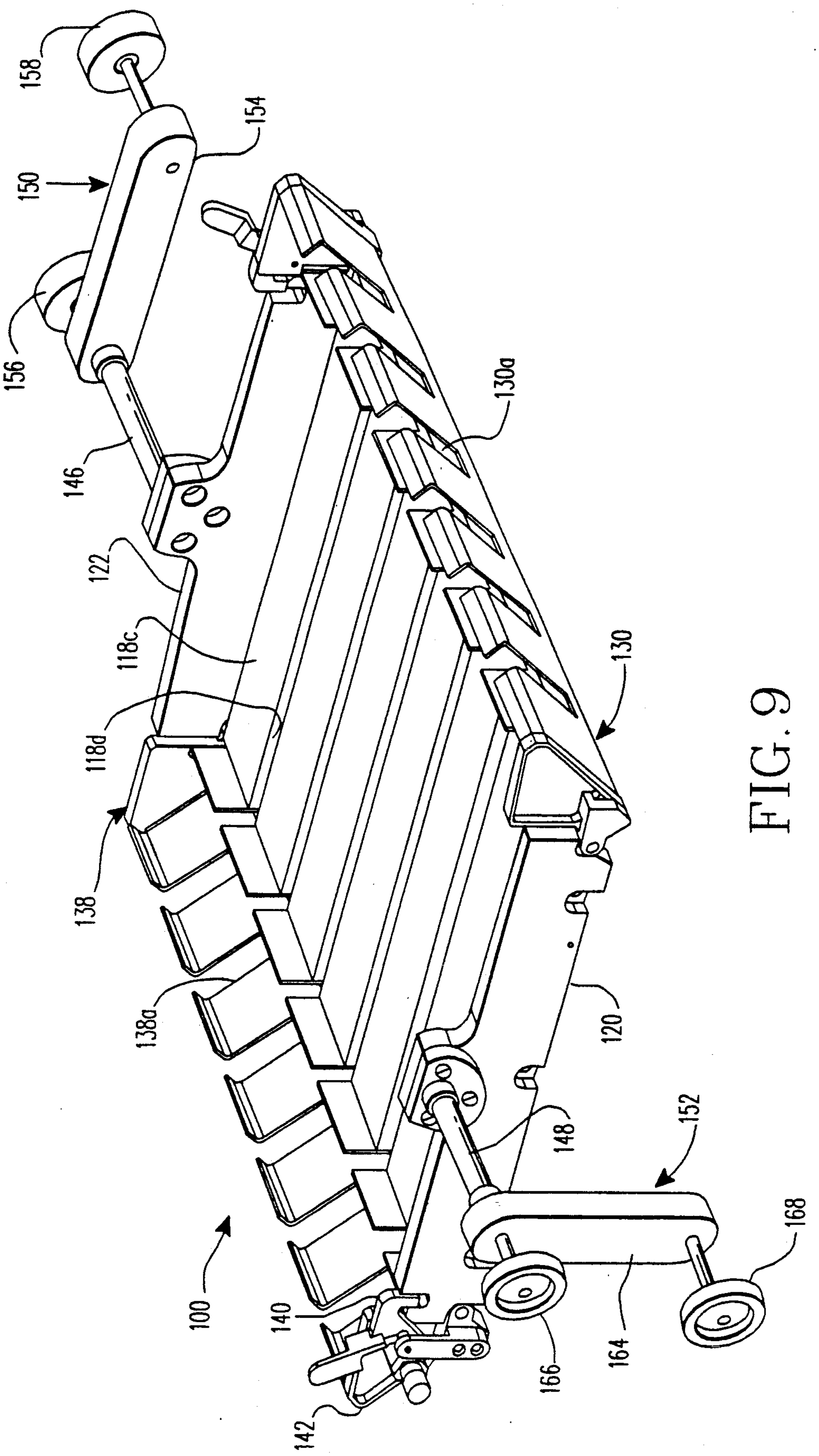
FIG. 9 is a perspective view of a carrier according to a preferred embodiment of the present invention.

A first door 130 is pivotally connected to the bottom plate 118 at the first end 118*a*, and is movable between open and closed positions. A latch 132 pivotally connected to a side plate 134 of the door 130 holds the door 130 in a closed position, as shown in FIG. 9, by cooperation with a catch 136 formed on one end of the side plate 122. Other means for opening and closing the door can be used instead of a latch. For example, the door may be held open or closed with a spring and simply cammed or otherwise pushed into the desired position with appropriate structures mounted on the frame. Also, magnets could be used to hold the door closed.

A second door 138 is pivotally connected to the bottom plate 118 at the second end 118*b*, and is also movable between open and closed positions. A latch 140 pivotally connected to a side plate 142 of the door 138 holds the door 138 in a closed position, as shown in FIG. 9, by cooperation with a catch 144 formed on one end of the side plate 120.

Each door has a plurality of slots 130*a* and 138*a*, spaced to interleave with tines of a rake mechanism (to be described below). Slots 130*a* and 138*a* are also aligned with the slots 118*d* formed in the upper surface 118*c* of the bottom plate 118.

Each carrier 100 is mounted on the chain drive 72 so as to remain horizontal while moving linearly and while moving arcuately through a turnaround motion on each sprocket. Two support shafts 146 and 148 are mounted in brackets which are bolted to upper portions of the opposite side plates 122 and 120, respectively, at a transverse medial plane of the carrier.

A horizontal stabilizer 150 is fixedly carried on the shaft 146, and a vertical stabilizer 152 is fixedly carried on the shaft 148. The stabilizer 150 includes a lever 154 which carries a pair of rollers 156 and 158 which are rotatably mounted on corresponding shafts 160 and 162, respectively, of which shaft 160 may be an extension of shaft 146. The lever 154 is horizontally oriented so that both roller 156 and 158 ride in a U-shaped track 163. Wheel shaft 162 is longer than shaft 160 so that wheel 158 extends outwardly beyond wheel 156. As will be explained in greater detail below, linear horizontal segments of track are "double-wide" so that both wheels 156 and 158 ride therein.

For mounting both stabilizers, the chain drive includes a pair of chains 72*a* and 72*b*, each having a plurality of links. Where a carrier 100 is to be mounted, mounting holes are formed in the link plates 72*c* and 72*d* (FIG. 12) of a particular link for receiving the shaft 148.

The vertical stabilizer 152 includes a vertically oriented lever 164 which carries a pair of rollers 166 and 168 which are rotatably mounted on corresponding shafts 170 and 172, respectively, of which shaft 170 may be an extension of shaft 148. The upper wheel 166 engages a linear, horizontal track segment 178 while the lower roller 168 is free, until the linear track segments approach an arcuate turnaround. Arms 164 and 154 are orthogonal to each other, while wheels 156 and 166 are coaxial. Bushings 174 and 176 separate the arms 154 and 164 from the chains 72*a* and 72*b*. Wheel 168 extends radially outwardly beyond wheel 166 by virtue of shaft 172 being larger than shaft 170.

The rollers 156, 158, 166 and 168 selectively engage and disengage track segments to maintain the horizontal disposition of the carrier. If the horizontal disposition is not maintained in the turnaround areas, mail pieces can potentially fall off the carriers.

Figure 15:
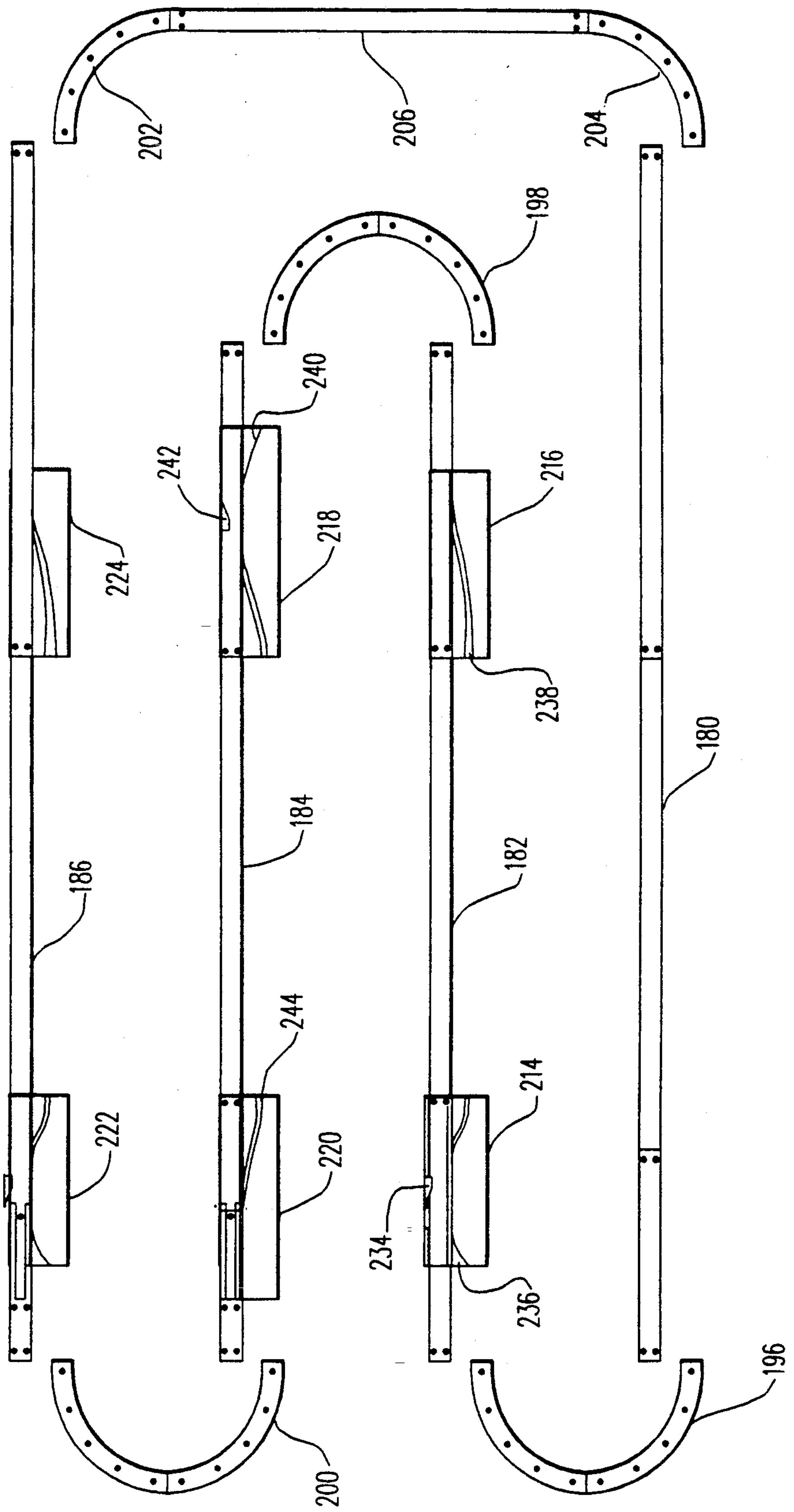
FIG. 15 is a side elevational view of one side of the guide track system according to the present invention.
Figure 16:
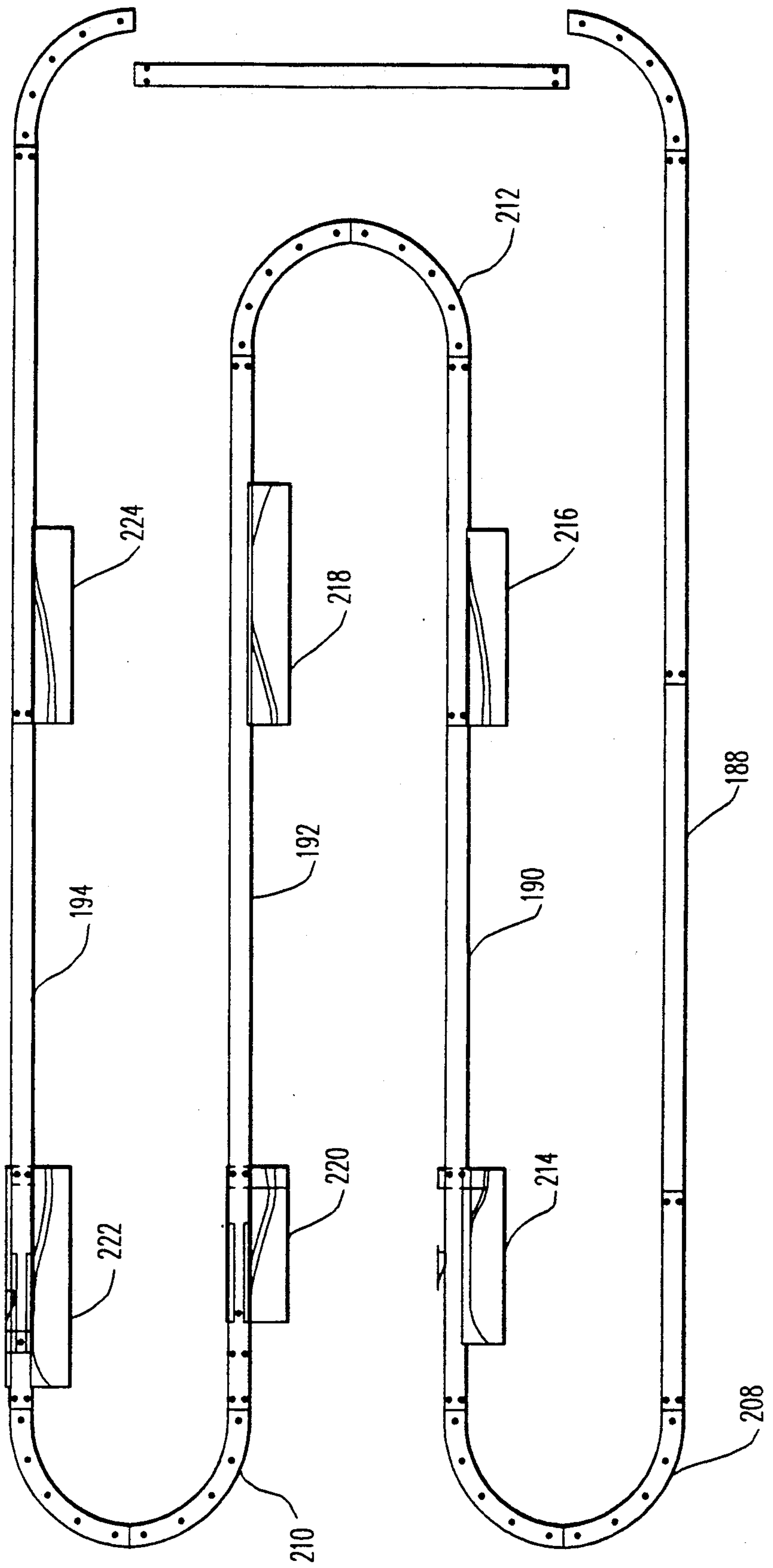
FIG. 16 is a side elevational view of the other side of the guide track system according to the present invention.

Referring to FIGS. 15 and 16, a track layout for both sides of the frame is illustrated. All of the track segments are U-shaped in cross section. FIG. 15 shows the back of the U-shaped track segments while FIG. 16 shows the front of the U-shaped track segments. In other words, the U-shaped track segments in FIG. 15 open into the page while the track segments in FIG. 16 open outwardly from the page. The track segments in FIG. 15 engage the wheels of the vertical stabilizer while the track segments in FIG. 16 engage the wheels of the horizontal stabilizer. Referring to FIG. 15, the horizontal track segments 180, 182, 184, and 186 engage the upper wheel 166 of the vertical stabilizer at the same time that the horizontal track segments 188, 190, 192, and 194 on the opposite side of the frame engage both of the wheels 156 and 158 of the horizontal stabilizer.

When the carriers reach the turnaround area associated with each sprocket, arcuate track segments are provided to facilitate the turnaround while maintaining horizontal disposition of the carriers. In FIG. 15, a semi-circular, arcuate track segment 196 is disposed at the end of the horizontal track segments 180 and 182, except that it is spaced vertically downwardly to receive the lower wheel 168 of the vertical stabilizer, while the upper wheel is disengaged from the track segment 180 simultaneously. After the carrier swings clockwise 180°, the lower wheel disengages from the arcuate track segment 196 and the upper wheel engages the track segment 182. Similar routines of engagement and disengagement occur at the arcuate track segments 198 and 200, and at the quarter-arcuate segments 202 and 204 which are interconnected by a vertical, linear section 206.

Figure 11:
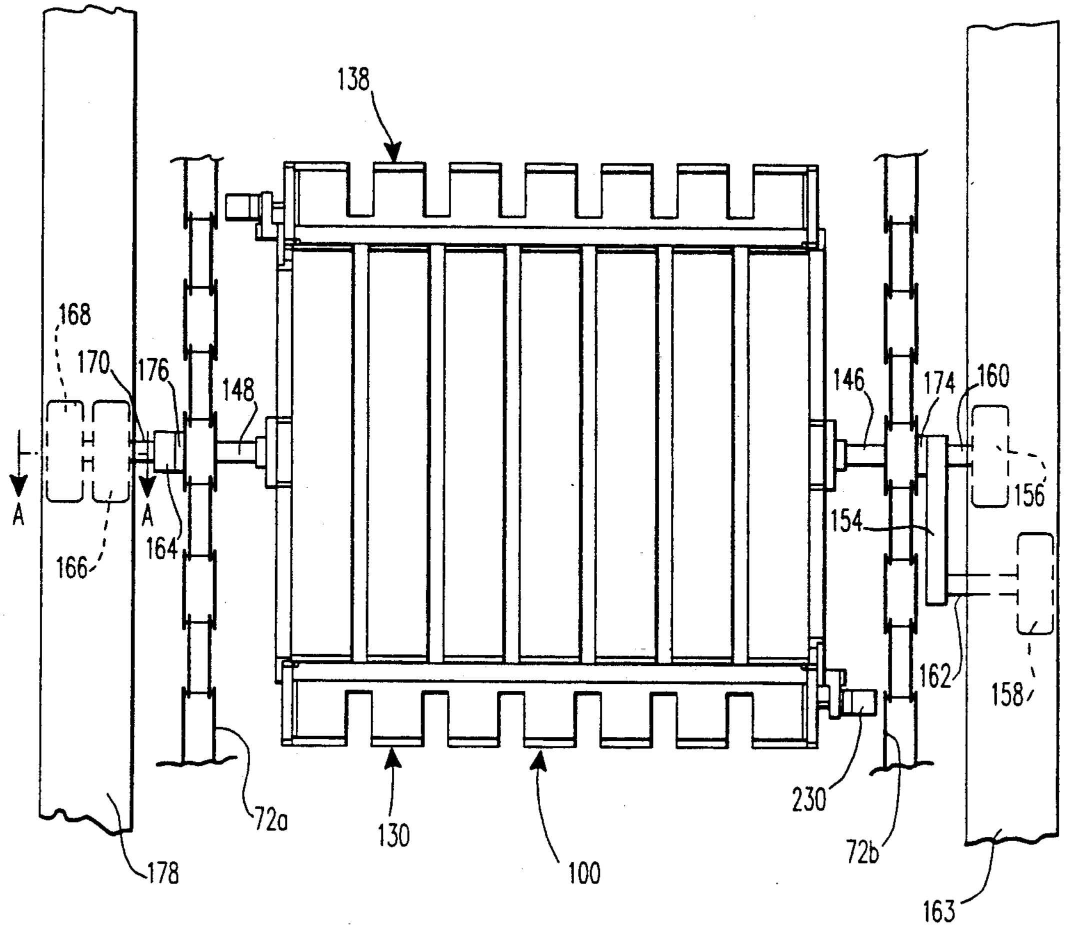
FIG. 11 is a plan view of the carrier of FIG. 9.
Figure 12:
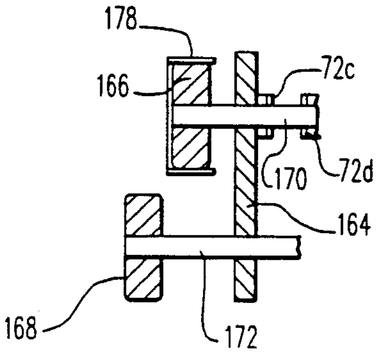
FIG. 12 is a sectional view taken along line A—A of FIG. 11.

On the opposite side of the frame, the horizontal stabilizer rides with both wheels in the horizontal segments 188, 190, 192 and 194. These straight, horizontal sections are of "double-wide" construction so that both wheels 156 and 158 ride in the track segments, as shown in FIG. 11. At the turnaround, arcuate segments 208, 210 and 212, the track segments are half the depth of the horizontal sections so that only the outermost wheel 158 is engaged by the track. With the wheel 156 disengaged at the arcuate sections 208, 210 and 212, the carrier is permitted to travel in the turnaround areas, while horizontal orientation is maintained by the vertical stabilizer.

One of the features of the present invention is that the doors on each carrier are opened and closed as the carriers travel along the transport path. For this purpose, a plurality of cam plates 214, 216, 218, 220, 222 and 224 are connected to the frame and positioned at one side or the other of the carrier to engage either the can follower 226 and latch lever 228 (FIGS. 9 and 10) or the cam follower 230 and latch lever 232 on the other side of the carrier. Thus, the cam plates are positioned inside of the guide tracks at one side or the other of the carrier. An opening and closing sequence of the doors can be understood again referring to FIGS. 15 and 16.

When the carrier is travelling from right to left in track segments 180 and 188, both doors are closed, since there are no bins under these track segments. Thus, when the turnaround is made at the arcuate segments 196 and 208, the doors are closed and if there is a mail piece in the carrier it will not fall out. If the carrier is empty and the induction system is going to deliver a piece of mail to the carrier, the piece of mail is delivered while both doors are closed at a point just after the carrier makes the turnaround at the lowermost pair of front sprockets. Immediately after passing through these arcuate segments, however, the rear door is opened and the carrier will pass over a plurality of bins that are located between the first and second runs of the conveyor. Thus, the cam plate 214 is positioned over the side of the carrier which will allow the engagement of the can follower on the rear door. As an example, the cam plate 214 is positioned on one side so that a latch opening cam 234 catches the latch lever 228, thereby causing the door 138 to open. The cam follower 226 is received in a can follower track 236 so that the door swings open. As mentioned with respect to the opposite door, means other than cam followers and latches can be used to open and close the door.

As the carrier approaches the opposite end of the horizontal track segment 182, it becomes necessary to close the rear door prior to entering the turnaround area of the arcuate track 198 and 212 because the door acts as an air dam as the carrier changes direction and enters straight tracks 184 and 186. Thus, the cam plate 216 is positioned on the same side as the cam plate 214, and the cam follower 226 is received in the cam follower track 238 of the cam plate 216, thus closing the door prior to entering the turnaround area.

After passing through the turnaround area, the rear door must be opened again. However, when the carrier reaches the horizontal linear segments 184 and 192, what is then the rear door was the front door in the preceding linear track segment. Thus, the cam plates 218 and 220 are located in juxtaposition to the opposite side of the carrier so that the cam follower track 240 engages the cam follower 230 instead of the cam follower 226. Similarly, a latch opening cam 242 engages the latch 232 to open the door, while the cam follower 230 engages the cam follower track 240.

As the carrier travels along the linear segments 184 and 190 with its rear door open, rake mechanisms (to be described below) positioned over the bins can be selectively actuated to rake mail pieces from the individual carriers. When the carrier approaches the turnaround area defined by arcuate track segments 200 and 210, the cam plate 220 cooperates with the corresponding cam follower to close the rear door by having the cam follower track 244 engage the cam follower 230.

After the carrier passes through the turnaround area defined by arcuate segments 200 and 210, the cam plate 222 is positioned to engage the latch 228 and cam follower 226 in the same manner as cam plate 214. Thus, can plates 214 and 222 are disposed on the same side of the frame in substantially the same vertical plane. Cain plate 224 is positioned on the same side as cam plate 222 and closes the rear door prior to entering the turnaround area defined by quarter-arcuate segments 202 and 204. Cam plate 224 is in substantially the same vertical plane as cam plate 216 on the same side of the frame. Cam plates 220 and 218 are disposed on the opposite side of the frame to engage the opposite side of the carriers.

It can be appreciated that as the carriers move along the guide tracks, the rear door is closed before entering a turnaround area and is opened after leaving the turnaround area. This allows the mail to be raked out of the carrier in the long, horizontal sections, while the mail is prevented from falling out in the turnaround sections with the door closed. The leading door also provides an air dam, as mentioned previously, to prevent fly-away mail.

Figure 10:
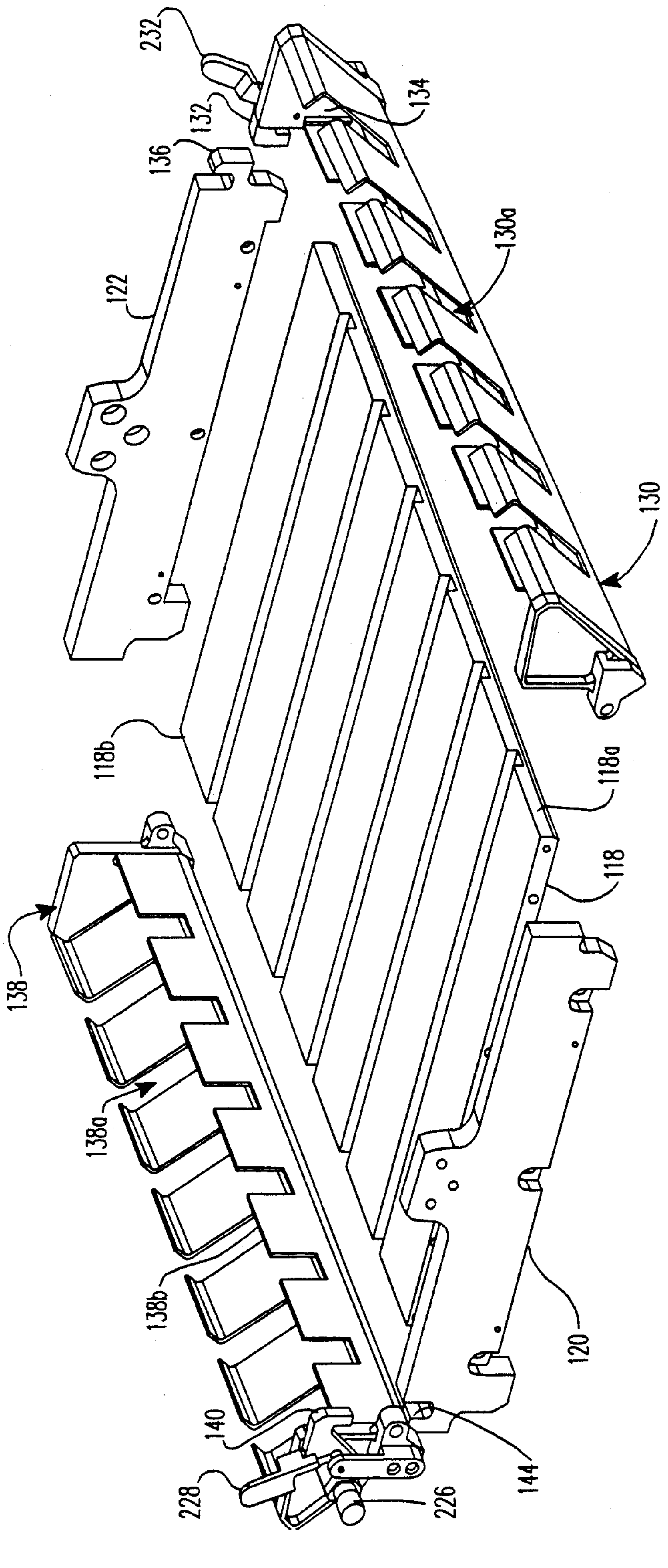
FIG. 10 is an exploded, perspective view similar to FIG. 9, with the stabilizers removed for clarity.

Referring to FIG. 10, each door, such as door 138 has an angled portion **138*a* and a stopper portion 138*b*. The two portions 138*a* and 138*b* can be made of the same sheet of material bent into the desired shape and cut to form the slots therein. The stopper portion 138*b* keep mail from riding up onto the slope surface of the angled portion 138*a***.

Since both doors are provided with the angled portions **138*a***, the angled portion of a following carrier helps guide or stack larger mail pieces which are being raked from the carrier immediately upstream.

A preferred rake mechanism according to the present invention is illustrated in FIGS. 17–20. The rake mechanism 246 is mounted on the frame with a pair of support blocks 248 and 250 which journal therebetween a shaft 252. The shaft 252 carries a plurality of rake tines 254 which are spaced along the shaft at intervals corresponding to the spacing of the slots provided in the doors and the grooves provided in the upper surface of the bottom plate of each carrier. In a preferred embodiment, the rake tines 254 are spaced at 2½ inch centers. This ensures that the smallest piece of mail, a 3×5 post card will be controlled.

The tines 254 are fixedly connected to and thereby rotatable with the shaft 252, which is caused to rotate by a fluid pressure cylinder, such as an air cylinder 256. The distal end of the extendable arm of the air cylinder 256 is pivotally connected to a lever 258 which is fixedly connected to the shaft 252. The opposite end of the air cylinder is pivotally connected to the frame, so that extension of the arm of the air cylinder causes the tines 254 of the rake mechanism 246 to move downwardly into engagement with a carrier. It can be appreciated that a rake mechanism 246 will be provided at several locations on the frame above each bin. Selective actuation of the air cylinder is controlled by a system controller which determines a piece of mail is destined for a particular bin. When the piece of mail is positioned above the designated bin, the rake mechanism is actuated to rake the piece of mail from the carrier.

Figure 20:
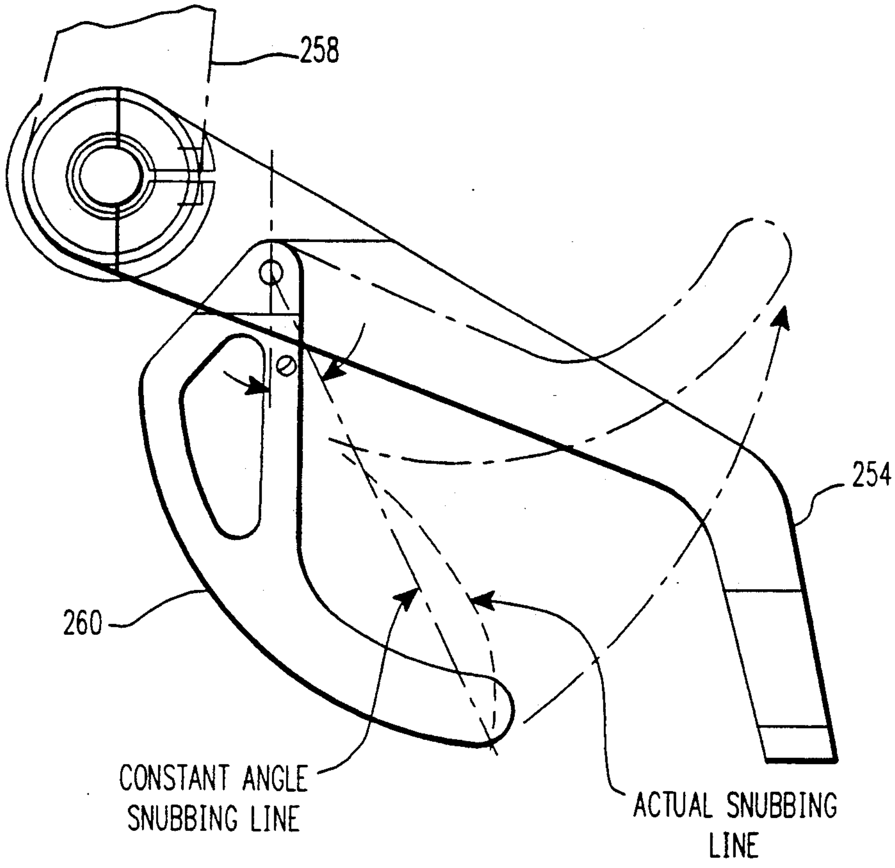
FIG. 20 is an enlarged end view of the rake mechanism.

Each tine 254 has a snubber 260 pivotally connected thereto. As shown in FIG. 20, the snubber 260 is designed to have the same snubbing angle on the mail regardless of the mail piece thickness.

Figure 18A:
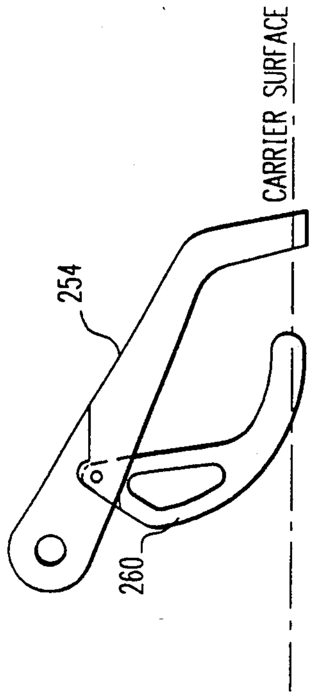
FIGS. 18(*a*) and 18(*b*) are end views showing the rake mechanism in operative and inoperative positions, respectively.
Figure 17:
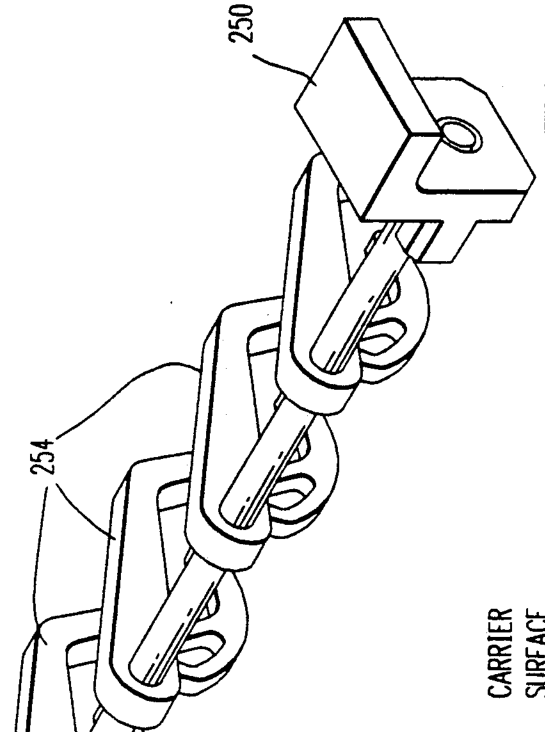
FIG. 17 is a perspective view of one of the rake assemblies according to the present invention.
Figure 17:
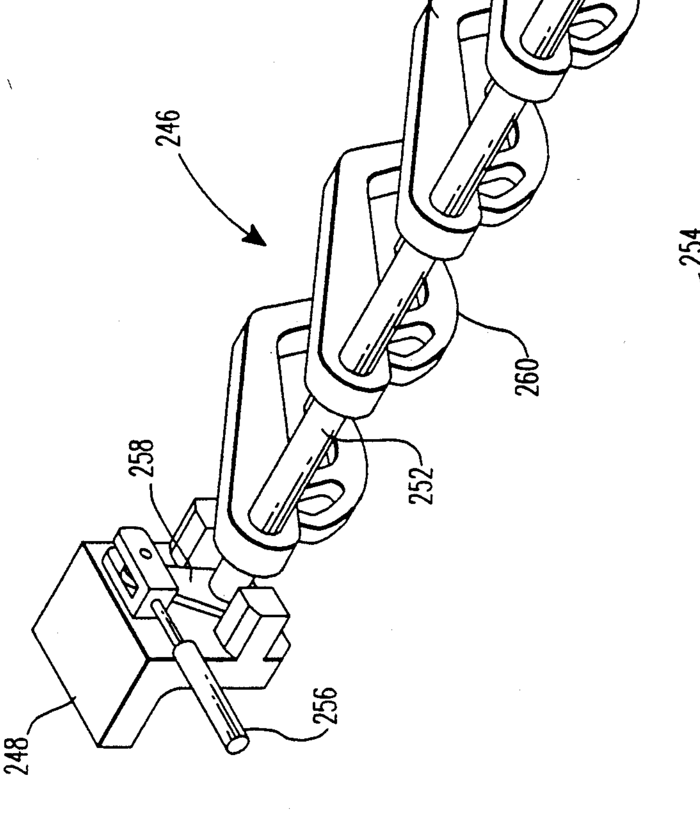
Figure 18B:
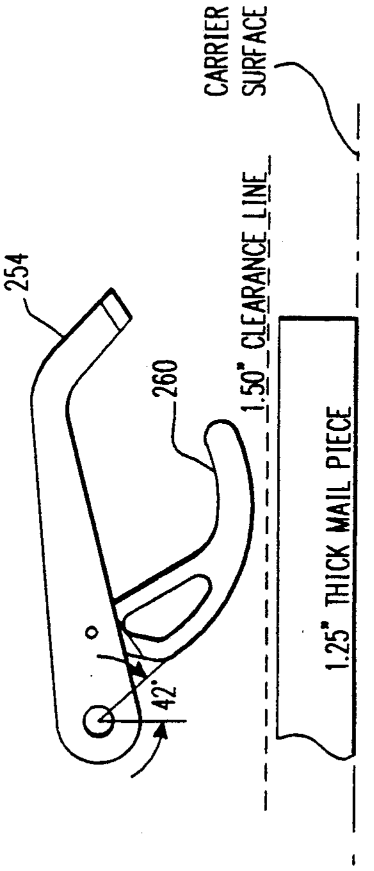

As shown in FIG. 18(*b*), when the rake mechanism is in the inoperative position, the snubber 260 is clear of the thickest piece of mail expected to run through the system, such as a mail piece of 1.25 inch thickness. For example, this would lead to a 1.5 inch clearance line that the snubber 260 must be above. Also, as shown in FIG. 18(*a*), when the rake mechanism is in the operative position, the tips of the rake tines 154 extend into the grooves of the carrier surface to ensure that very thin mail pieces are extracted.

Figure 19A:
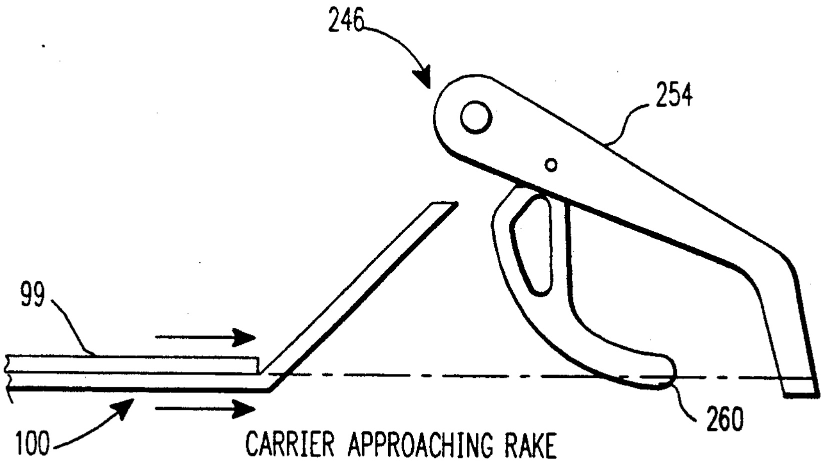
FIGS. 19(*a*)-(*c*) are schematic, sequential views showing the rake mechanism and carrier.
Figure 19B:
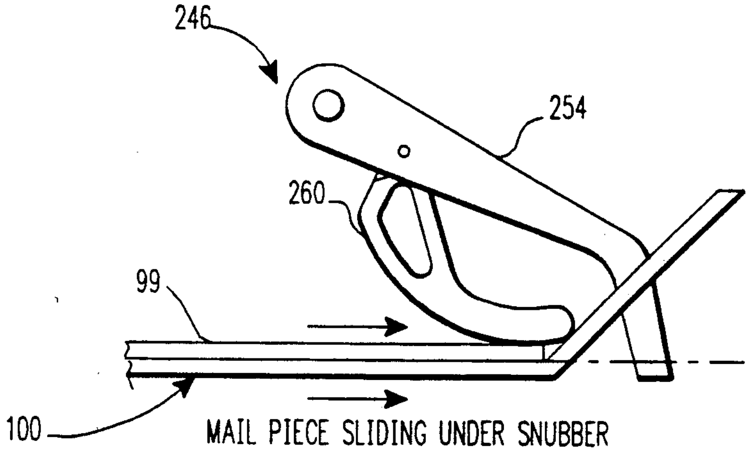
Figure 19C:
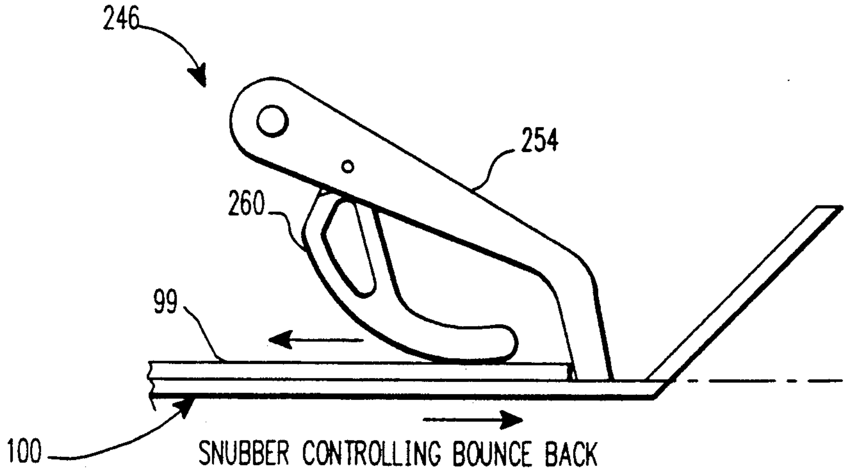

FIGS. 19(*a*)–19(*c*) illustrate three phases of the rake/-snubber operation. In FIG. 19(*a*), the carrier 100 is illustrated to be approaching the rake mechanism 246 with a mail piece 99 disposed on the carrier 100.

In FIG. 19(*b*), the mail piece 99 is seen to be sliding under the snubber 260 before hitting the rake tine 254. In FIG. 19(*c*), the mail piece 99 can be seen after hitting the rake tine 254 with the bounce back being controlled by the snubber 260.

When the mail bounces back, a small friction force exists between the snubber 260 and the mail piece 99. As the mail piece tries to slide back past the snubber, the friction force between the two tends to rotate the snubber clockwise, further increasing the friction force between the mail piece and the snubber 260 and thus effectively clamping it down to the carrier 100. This clamping force is very effective in controlling the bounce back of the mail piece 99. Control of the mail piece is crucial to the raking process and results in an increased quality of the mail stack in the bin. A small torsion spring biases the snubber 260 in a clockwise direction relative to the tine 254 and thus aids in holding the snubber 260 down against the mail after the mail piece 99 impacts the snubber 260.

A constant snubbing angle can be seen in FIG. 20 and is based on the theory that if the line of contact with the mail piece remains at the same angle from the vertical regardless of the mail piece thickness, the geometry of both the normal force and the resulting friction force, between the snubber 260 and the mail piece 99 and between the mail piece 99 and the carrier 100, remains constant. The actual force applied increases with the mail pieces thickness due to the torsion spring (not shown). Increasing the force applied to the mail with increasing thickness is reasonable, in that the weight of the mail piece increases proportionately to the mail pieces thickness. If a mail piece that is thick has a low density, and therefore, is light in weight, the mail piece will still be controlled.

Another aspect of the present invention is to finish the upper surface of the bottom plate to yield a surface finish of 500 microinches. This surface roughness has been found to yield a coefficient of friction high enough to aid in the snubbing process while still being smooth enough so that the mail is not damaged when it is raked off a carrier 100.

Numerous modifications and adaptations of the present invention will be apparent to those so skilled in the art and thus, it is intended by the following claims to cover all such modifications and adaptations which fall within the true spirit and scope of the invention.

What is claimed is:

1. A transport/stacker module comprising:

a support frame having a front end and a rear end, the front end being adjacent a mail induction system;

a first pair of front sprockets mounted in the front end of the frame for rotation about a horizontal axis transverse the frame;

a first pair of rear sprockets mounted on the rear end of the frame for rotation about a horizontal axis transverse the frame;

an endless loop conveyor running between the first pairs of front and rear sprockets and defining a first run and a second run vertically above the first run;

a plurality of horizontally oriented carriers attached to the conveyor at spaced intervals, each carrier receiving a mail piece from the mail induction system;

a plurality of bins disposed between the first and second runs, each having an open top disposed below the second run;

drive means for rotating one of the first pairs of front and rear sprockets thus moving the carriers along a transport path; and a plurality of rake mechanisms, one being disposed above each of the plurality of bins and above the second run, each rake mechanism being selectively actuated to rake a mail piece from a corresponding one of the carriers into a designated one of the bins as the drive means positions the corresponding carrier over the designated bin;

wherein each carrier has two opposite ends, a bottom, a pair of opposite sides extending upwardly from the bottom, and two openable and closable doors, one being disposed at each end.

2. A transport/stacker module according to claim 1, further comprising a second pair of front sprockets disposed above the first pair of front sprockets, a second pair of rear sprockets, disposed above first pair of rear sprockets, and a third pair of rear sprockets, the second pair of front sprockets and the second and third pairs of rear sprockets being mounted in the frame for rotation about a horizontal axis transverse the frame, and the conveyor running from the first pair of front sprockets to the third pair of rear sprockets, and from the third pair of rear sprockets to the second pair of front sprockets, and from the second pair of front sprockets to the second pair of rear sprockets, and from the second pair of rear sprockets back to the first set of rear sprockets, thereby defining in addition to the first and second runs, a third run disposed above the second run and a fourth run above the third run.

3. A transport/stacker module according to claim 2, wherein the plurality of bins is disposed between the first and second runs, between the second and third runs, and between the third and fourth runs and wherein the frame includes means for supporting the plurality of bins between the first and second runs, between the second and third runs, and between the third and fourth runs.

4. A transport/stacker module according to claim 3, wherein the supporting means comprises a plurality of shelves mounted on the frame at the first, second and third runs.

5. A transport/stacker module according to claim 2, wherein the plurality of bins are disposed between the second and third runs and between the third and fourth runs, in addition to being disposed between the first and second runs.

6. A transport/stacker module according to claim 1, wherein the endless loop conveyor is a pair of chains running parallel to each other on the first pairs of front and rear sprockets.

7. A transport/stacker module according to claim 1, further comprising guide means, mounted on the frame for guiding the carriers as they move along the path.

8. A transport/stacker module according to claim 7, wherein the carrier includes a horizontal stabilizer and a vertical stabilizer, each of which engages the guide means to maintain the horizontal orientation of the carriers throughout movement along the path.

9. A transport/stacker module according to claim 1 further comprising means for closing a rearmost one of the two doors as the carrier approaches one of the pairs of sprockets, and means for opening a rearmost one of the two doors as the carrier leaves one of the pairs of sprockets.

10. A transport/stacker module according to claim 9, wherein the opening means comprises a latch, and a plurality of cams mounted on the frame immediately downstream of each pair of sprockets.

11. A transport/stacker module according to claim 10, wherein the closing means comprises a cam follower provided on each door of each carrier and a plurality of cam follower tracks disposed immediately upstream of each pair of sprockets.

12. A transport/stacker module comprising:

- a support frame having a front end and a rear end, the front end being adjacent a mail induction system;
- a first pair of front sprockets mounted in the front end of the frame for rotation about a horizontal axis transverse the frame;
- a first pair of rear sprockets mounted on the rear end of the frame for rotation about a horizontal axis transverse the frame;
- an endless loop conveyor running between the first pairs of front and rear sprockets and defining a first run and a second run vertically above the first run;
- a plurality of horizontally oriented carriers attached to the conveyor at spaced intervals, each carrier receiving a mail piece from the mail induction system;
- a plurality of receptacles disposed between the first and second runs, each having an open top disposed below the second run;
- drive means for rotating one of the first pairs of front and rear sprockets thus moving the carriers along a transport path; and
- a plurality of rake mechanisms, one being disposed above each of the plurality of bins and above the second run, each rake mechanism being selectively actuated to rake a mail piece from a corresponding one of the carriers into a designated one of the bins as the drive means positions the corresponding carrier over the designated bin;
- wherein each carrier comprises a bottom plate having first and second ends and two opposite sides, a pair of side plates, each extending upwardly from a respective side of the bottom plate, and being oriented in a direction of movement of the conveyor, a first door disposed at the first end of the bottom plate and being movable between open and closed positions, first latch means for holding the first door in the closed position, a second door disposed at the second end of the bottom plate and being movable between open and closed positions, second means for holding the second door in the closed position, and means operatively coupled to the first and second holding means for opening and closing the first and second doors.

13. A transport/stacker module according to claim 12 further comprising a plurality of grooves formed in an upper surface of the bottom plate.

14. A transport/stacker module according to claim 13, further comprising a plurality of strips of reflective material, one being disposed in each of the plurality of grooves, and a plurality of light detectors, one being disposed over each groove of the bottom plate.

15. A transport/stacker module comprising:

- a support frame having a front end and a rear end, the front end being adjacent a mail induction system;
- a first pair of front sprockets mounted in the front end of the frame for rotation about a horizontal axis transverse the frame;
- a first pair of rear sprockets mounted on the rear end of the frame for rotation about a horizontal axis transverse the frame;
- an endless loop conveyor running between the first pairs of front and rear sprockets and defining a first run and a second run vertically above the first run;
- a plurality of horizontally oriented carriers attached to the conveyor at spaced intervals, each carrier receiving a mail piece from the mail induction system;
- a plurality of receptacles disposed between the first and second runs, each having an open top disposed below the second run;
- drive means for rotating one of the first pairs of front and rear sprockets thus moving the carriers along a transport path; and
- a plurality of rake mechanisms, one being disposed above each of the plurality of bins and above the second run, each rake mechanism being selectively actuated to rake a mail piece from a corresponding one of the carriers into a designated one of the bins as the drive means positions the corresponding carrier over the designated bin;
- wherein each rake mechanism includes a support shaft journalled for rotation about a horizontal rotation axis transverse the direction of transport, and being mounted above each bin, a plurality of rake tines spaced at intervals along the shaft and being pivotal with the shaft, means for rotating the tines downwardly at a designated time when the carrier approaches the rake tines, to engage a mail piece located in the carrier, and a plurality of snubbers pivotally connected to corresponding ones of the rake tines, and being disposed to engage the mail piece prior to a time when the rake tines engage the mail piece.

* * * * *